Jan. 26, 1960

L. D. DE LALIO 2,922,946

SATURABLE REACTOR DEVICES

Filed Dec. 19, 1955

INVENTOR
LOUIS D. DE LALIO
BY
R. V. Craddock
ATTORNEY 2,922,946

SATURABLE REACTOR DEVICES

Louis D. De Lalio, Huntington, N.Y., assignor to Sperry Rand Corporation, a corporation of Delaware Application December 19, 1955, Serial No. 553,811

2 Claims. (Cl. 323—89)

The present invention relates to saturable reactor devices.

Saturable reactor devices are known in the art for providing a full wave or a half wave output in response to a signal input control voltage. Since the output of a full wave device in response to a signal input thereto occurs during both half cycles of an alternating power supply voltage, more power output is provided from the device than is provided from a half wave device having the same signal input and the same power supply voltage supplied to the aforementioned full wave device. This could be important when such a device comprises a magnetic amplifier for driving a two phase A.C. servomotor, for example. The power provided by a half wave device may be too low for driving the motor whereas the power provided by a full wave device might be sufficient.

However, a conventional full wave magnetic amplifier generally has at least four inductive control windings in series with each other, and therefore, an appreciable $L/R$ time constant for input control signals so that the speed of response for such an amplifier is not as rapid as that of a half wave magnetic amplifier. This limitation is inherent in a full wave amplifier as aforedescribed since at no time during the operating cycle thereof will the inductance of more than two of the four control windings be reduced to a minimum by saturation of the cores thereof.

Therefore, it is an object of the present invention to provide an improved full wave saturable reactor device having the inherent advantages of full wave reactor devices and the further advantage of a fast response time of the order of that of conventional half wave saturable reactor devices.

It is a further object of the present invention to provide an improved saturable reactor device as aforedescribed for receiving a phase reversible A.C. input signal and providing a phase reversible A.C. or a polarity reversible D.C. output signal with the magnitude of the output signal being a function of that of the input signal and the phase or polarity or the output signal being dependent on the phase of the input signal.

It is yet another object of the present invention to provide a saturable reactor device as aforedescribed which is capable of receiving a D.C. input signal and providing a phase reversible A.C. output or polarity reversible D.C. output signal with the magnitude of the output signal being a function of that of the input signal and the phase or polarity of the output signal being dependent on the polarity of the input signal.

It is still a further object of the present invention to provide an improved type of magnetic amplifier having desirable characteristics of both half wave and full wave magnetic amplifiers known in the art.

The foregoing and other objects and advantages of the present invention are attained by providing a two stage saturable reactor device having a bridge type circuit of inductive power windings comprising a half wave driver stage and a bridge type circuit of inductive power windings comprising a half wave driven stage coupled thereto with a load coupled to both stages. Control voltage windings are provided in the driver stage for receiving an input control signal. Control voltage windings are further provided with the driven stage, the latter control voltage windings being coupled to the driver stage so that an output of the driver stage is supplied thereto and to the load on one half cycle of a power voltage input to the device. The driven stage is conditioned by the output of the driver stage to supply a voltage to the load on the succeeding and opposite half cycle of the power voltage input to the device so that a full wave output voltage is supplied to the load.

Referring to the drawings.

Figures 1, 2, 3:
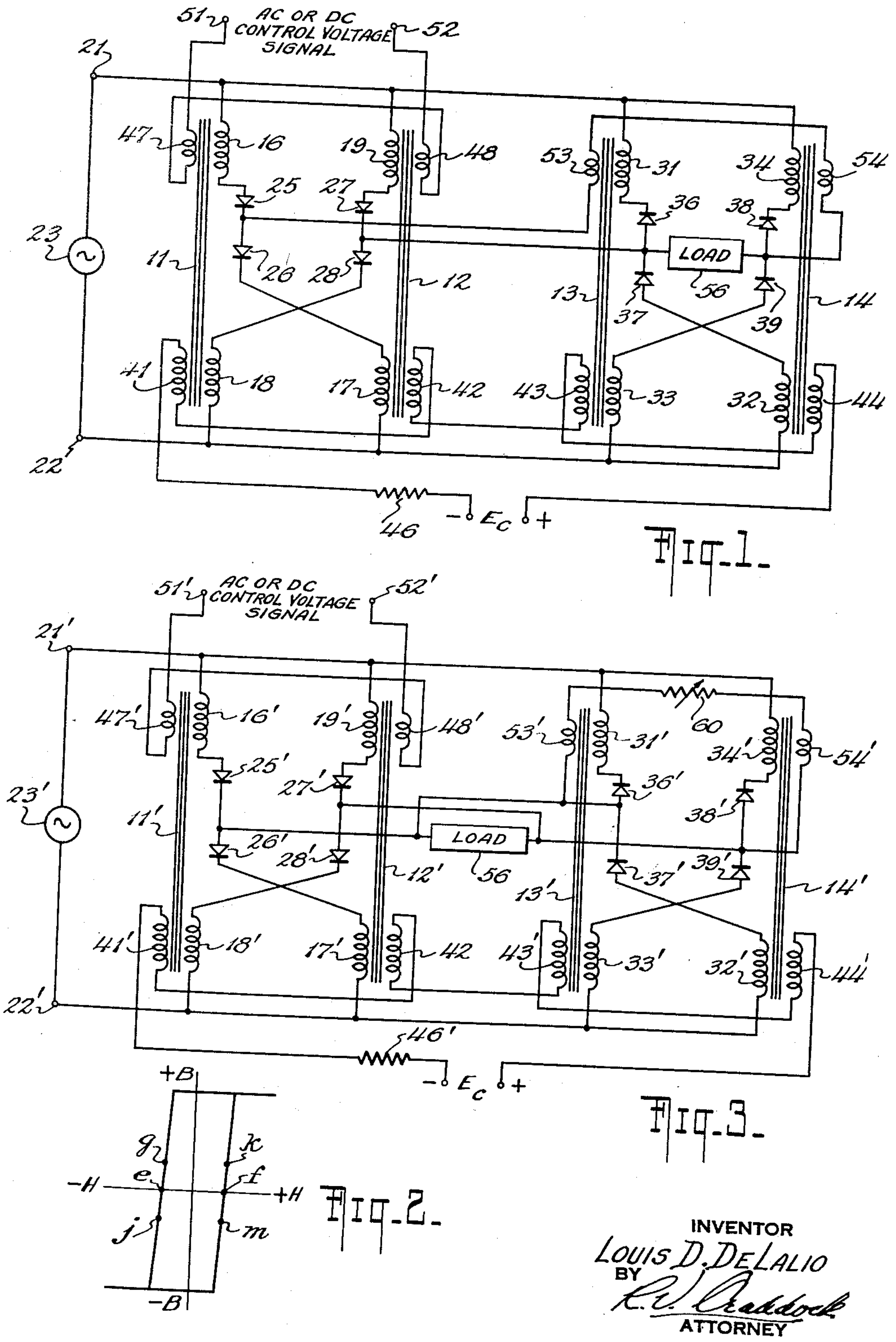
Fig. 1 is a schematic circuit diagram of a first embodiment of a saturable reactor device in accordance with the present invention.
Fig. 2 is a hysteresis loop diagram for use in explaining the present invention.
Fig. 3 is a schematic circuit diagram of an alternative embodiment of a saturable reactor device in accordance with the present invention.

Referring to Fig. 1, the numerals 11–14 designate four magnetic core elements for the saturable reactor device. The cores 11–14 are preferably of the same size, shape and material and designed to have substantially rectangular hysteresis or B–H loops.

A first or driver stage of the device is comprised of four similar power windings 16–19 connected in a bridge type circuit between the output terminals 21 and 22, of a sine wave alternating voltage power supply 23 having a frequency of the order of 400 cycles per second, for example. Alternate windings 16 and 18 of the bridge type circuit are disposed about core 11 with the other pair of alternate windings 17 and 19 of the bridge circuit being disposed about the core 12. A pair of similarly poled rectifiers 25 and 26 are connected in series between two terminals of windings 16 and 17 in Fig. 1, a further similar pair of rectifiers 27 and 28 being serially connected between two terminals of windings 18 and 19.

A second or driven stage of the device shown in Fig. 1 is comprised of the power windings 31–34 similar to windings 16–19 and connected in a second bridge type circuit between the aforementioned output terminals 21—22 of the power supply 23 so as to be in parallel relationship with the first mentioned bridge type circuit. Alternate windings 31 and 33 of the second mentioned bridge circuit are wound upon the core 13 with the remaining alternate windings 32 and 34 being wound upon the core 14. A pair of similarly poled rectifiers 36 and 37 are connected together in series between two terminals of the windings 31 and 32 with a further pair of similar rectifiers 38 and 39 serially connected between two terminals of windings 33 and 34. The arrowhead side of each rectifier illustrated in the drawings represents the anode terminal thereof which should be at a positive potential relative to the other side of the rectifier for conduction therethrough to occur. The rectifiers 36–39 conduct in opposite directions from rectifiers 25–28 so that the first stage of the device in Fig. 1 operates on one half cycle of an input supply voltage from source 23 and the second stage of the device operates on the opposite half cycle of such a voltage.

Bias windings 41–44 connected in series with a resistor 46 and a pair of terminals for receiving a direct current biasing voltage $E_c$ are disposed about the reactor cores 11–14, respectively, for setting the reference magnetic flux level of each of the cores. The biasing current through each of windings 41–44 should magnetize each of the cores 11–14 in an opposite direction from the direction of magnetization of each core caused by the conduction of current through the power windings for each core. The number of turns for each of the bias windings 41–44 is regulated so that the cores 11 and 12 are set to the same reference magnetic flux level by a negative magnetizing force and the cores 13 and 14 are set to the same reference magnetic flux level by a positive magnetizing force, for example.

A pair of control windings 47 and 48 are connected in series with a pair of input terminals 51 and 52 for receiving a suitable control signal voltage for the device. The control windings 47 and 48 are disposed upon cores 11 and 12 of the first stage of the device and wound so that a signal voltage at any particular time between terminals 51—52 will cause the magnetic flux level of each of the cores 11 and 12 to be changed in opposite directions. A further pair of control windings 53 and 54 for the second stage of the device are connected together in series and disposed about the cores 13 and 14 and wound so that a voltage at any particular time across windings 53—54 will cause the magnetic flux level of each of cores 13 and 14 to change in opposite directions. An end terminal of the control winding 53 is connected to the junction point between the rectifiers 25 and 26. An end terminal of the control winding 54 is connected to the junction point between the rectifiers 38 and 39.

A suitable load 56 has one terminal connected to the aforementioned junction point between rectifiers 27 and 28 and to the junction point between rectifiers 36 and 37. The other terminal of load 56 is connected to the junction point between rectifiers 38 and 39. Thus, the load 56 is effectively in series with output terminals for each half wave stages in Fig. 1. The exact nature of load 56 is a function of the use for which the reactor device is adapted. If the device is to be used as an A.C. amplifier, the load 56 might comprise a two phase A.C. servomotor, for example.

In operation of the device shown in Fig. 1, first assume that there is no control voltage applied to terminals 51 and 52, that the source 23 is not supplying a power voltage to the device, and that the bias windings 41–44 are receiving a bias voltage $E_c$ of the polarity indicated in Fig. 1. If the turns of the windings 41–44 are properly regulated, the cores 11–14 can be magnetized to the same reference flux level with the cores 11 and 12 being magnetized by a negative magnetizing force —H in one direction and the cores 13 and 14 by a positive magnetizing force +H in the opposite direction. Each of the cores 11–14 might have a magnetization curve or B–H loop generally like the rectangular hysteresis loop shown in Fig. 2, which is a plot of the magnetic flux density B for each core as a function of the magnetizing force H applied thereto. The cores 11 and 12 might be biased by windings 41—42 to a flux level designated by point *e* on the B–H loop of Fig. 2 with the cores 13 and 14 being biased by the windings 43—44 to a reference flux level designated by point *f* on the aforementioned loop, for example.

Assume now that a sine wave alternating voltage is supplied by the source 23 to the terminals 21 and 22. If the terminal 21 is positive with respect to the terminal 22 on the first half cycle of this power supply voltage, the rectifiers 25–28 in the first stage of the device will conduct and power supply current will flow through the power windings 16–19. If there had been no control voltage signal applied to the terminals 51 and 52, the cores 11 and 12 would have previously been biased to the same reference flux level designated by point *e* on the hysteresis loop shown in Fig. 2. The magnetizing current through windings 16–19 is in such a direction that the flux density in the cores 11 and 12 goes positive. At some time during the aforementioned half cycle of the voltage from source 23 at a phase angle of approximately 90°, for example (which is determined by proper design of the system), the cores 11 and 12 can be made to fire simultaneously due to magnetic saturation thereof by the magnetizing field of the power current through the windings 16–19. This will greatly lower the inductive impedance $Z_1$ of windings 16–19, but will not upset the balance of the bridge circuit in which such windings are included since the cores 11 and 12 were simultaneously saturated. Thus, there will be no voltage difference between the junction of rectifiers 25—26 and the junction of rectifiers 27—28 and no voltage is supplied to load 56 and the second stage of the device.

At the end of the aforementioned first half cycle of the voltage from source 23, the cores 11 and 12 will remain at a positive +B magnetic saturation level due to the residual magnetism retained therein. However, on the succeeding half cycle of the voltage from source 23 when the terminal 21 is negative with respect to the terminal 22 so that there is no current flow through power windings 16–19, the current through biasing windings 41 and 42 will cause the cores 11 and 12 to return to their initial states of magnetization at point *e* on the B–H loop of Fig. 2.

On the aforementioned succeeding half cycle of the voltage from source 23 when the terminal 22 goes positive with respect to the terminal 21, the rectifiers 36–39 in the next stage of the device will be conductive. If the operating characteristics of the device are properly chosen, the cores 13 and 14 can be saturated at a phase angle of 270°, for example, of the power supply voltage from source 23 during this succeeding half cycle, for example. Power current through windings 31–34 is in such a direction that the flux density for cores 13 and 14 goes negative. Since there was no control voltage previously applied to the control windings 53 and 54 during the previous half cycle of the voltage from source 23, the cores 13 and 14 will also be saturated and fired simultaneously. Saturation is at a —B magnetic saturation level in Fig. 2.

There will be no change in voltage between the junction of rectifiers 36—37 and the junction of rectifiers 38—39 if cores 13 and 14 are fired simultaneously. On the next half cycle of the voltage from source 23 after the second stage of the device is finished conducting, the cores 13 and 14 are returned to their original state of magnetization at point *f* on the hysteresis loop of Fig. 2 by the magnetizing current through the bias windings 43 and 44.

Assume now that a small D.C. control voltage signal is applied between the terminals 51 and 52 with terminal 51 positive with respect to terminal 52. During the half cycle of the voltage from source 23 when the windings 16–19 are not conducting, the flux level of the core 11 will only go down from a +B saturation level to point *g* on the B–H loop of Fig. 2 while the flux level of core 12 will go further down on the B–H loop to point *j*. This occurs since the control current travels through the control windings 47 and 48 in opposite directions at any particular time and when terminal 51 is positive with respect to terminal 52, the direction of the current is such that the magnetizing force provided thereby opposes the negative magnetizing force applied to core 11 by bias winding 41 and aids the negative magnetizing force applied to core 12 by bias winding 42. On the following half cycle of the voltage from source 23 when the power windings 16–19 are conducting, it can readily be seen that the core 11 will be returned to a +B saturation level before core 12 so as to unbalance the bridge circuit comprised of windings 16–19. During the time the bridge circuit comprising windings 16–19 is unbalanced, a voltage is provided between the junction of rectifiers 25—26 and the junction of rectifiers 27—28. This voltage is supplied to the load 56 and to the control windings 53 and 54 of the second stage of the device shown in Fig. 1.

The aforementioned voltage supplied to the windings 53 and 54 and current therethrough provide oppositely directed magnetizing forces for cores 13 and 14 so that the core 13 is magnetized to a flux level designated by point *m* in Fig. 2 and the core 14 is magnetized to the level designated by point $k$ during the non-conducting half cycle for power windings 31–34, each of cores 13 and 14 having previously been at a −B saturation level as a result of power current flow through windings 31–34. When the terminal 22 goes positive with respect to terminal 21, the power windings 31–34 in the second stage of the device will again become conducting. Since the flux level for the core 13 was set to the point $m$ during the previous half cycle of the voltage from source 23 and the core 14 was set at the flux level $k$, it can readily be seen that the core 13 is returned to a −B saturation level and fired before the core 14 during this half cycle. Therefore, there will be a voltage developed between the junction of rectifiers 38 and 39 and the junction between the rectifiers 36 and 37 for supply to the load 56 during the second half cycle of the voltage from source 23 between the times of saturation for the cores 13 and 14. With the control windings 53 and 54 connected as shown in Fig. 1, an A.C. output voltage is supplied to load 56 whose magnitude is a function of the D.C. control voltage supplied to terminals 51 and 52 and whose phase reverses with a reversal in polarity of the aforementioned D.C. control voltage. A pulsating full wave load voltage of the constant polarity may be provided by reversing the control windings 53 and 54 in the second stage of the device. The polarity of such a pulsating voltage will reverse with a reversal in polarity of the signal voltage supplied to terminals 51—52.

If an A.C. control voltage were applied to the terminals 51 and 52 in the device of Fig. 1, the control voltage being in phase with or 180° out of phase with the alternating voltage from source 23, it can readily be seen that an amplified A.C. output voltage is supplied to load 56. The phase of the output reverses with a reversal in phase of the control voltage input signal so that a full wave magnetic amplifier is provided. It should be apparent that the response time of the device is equivalent to that for half wave magnetic amplifiers known in the art since the inductances of both of the control windings 47—48 are reduced to a minimum during the operating half cycle of the first stage of the device while the inductances of both of the control windings are reduced to a minimum during the next succeeding half cycle when the second stage is operating.

If the control windings 53 and 54 are reversed with respect to each other, the output voltage supplied to the load 56 would be of the same polarity on each half cycle of the power voltage from source 23 for an A.C. signal voltage input. The polarity of such a voltage would reverse with a reversal in phase of an alternating input signal control voltage supplied to the terminals 51 and 52.

The circuit shown in Fig. 3 is comprised of the same elements as that of Fig. 2, said elements being referred to by corresponding primed reference numerals in Fig. 3. The difference in the circuit shown in Fig. 3 from that of the circuit shown in Fig. 2 is in the connecting of the control windings of the driven stage. Instead of connecting windings 53′—54′ in series with the output of the first stage, they are effectively connected in parallel across the load 56′ (the output of the first stage).

A resistor 60 of adjustable resistance value is connected between the control windings 53′—54′ for regulating the gain of the circuit in Fig. 3. Otherwise, the operation of the device of Fig. 3 is similar to that of Fig. 1 so needs no detailed description.

Since many changes could be made in the above construction and many apparently widely different embodiments of this invention could be made without departing from the scope thereof it is intended that all matter contained in the above description or shown in the accompanying drawings should be interpreted as illustrative and not in a limiting sense.

What is claimed is:

1. A magnetic amplifier arrangement for producing a full-wave output from a half-wave input control signal, comprising a source of alternating current, a first magnetic amplifier stage and a second magnetic amplifier stage connected across said source, each of said first and second stages being a half-wave push-pull bridge amplifier formed by a pair of saturable reactor cores, a pair of load windings wound on each of said cores, a first branch circuit including in series one load winding of each core with a first pair of similarly poled unilateral conductor devices interposed therebetween, a second branch circuit including in series the other load winding of each core with a second pair of similarly poled unilateral conductive devices interposed therebetween, said first and second branch circuits being connected across said alternating current source and said first and second pairs of devices being poled in the same direction with respect to said source, the unilateral conductive means of each stage being so poled that half-wave current flows through each of said stages on alternate half-cycles of said alternating current source, circuit means for connecting said pair of output terminals at points between the unilateral conductive devices in each of said branch circuits so that said output terminals are common to said first and second stages, a load circuit connected across said pair of terminals, and connections that include control winding means disposed in said first stage and connected to a source of control voltage for applying an input control signal solely to said first stage whereby said first stage delivers to said load an output voltage correlative to said control signal on the conductive half-cycle of said first stage, said first and second stages being so interconnected that the output voltage of said first stage controls the flux setting in said second stage whereby, during the conductive half-cycles of said second stage, said stage delivers to said load an output voltage which has the same value as that delivered by the first stage on the preceding half-cycles of the alternating current source.

2. The circuit of claim 1, further including a control winding for each core of said second stage, and circuit means for serially connecting said control windings between said points of said first stage.

References Cited in the file of this patent

UNITED STATES PATENTS

| | | |
|---|---|---|
| 2,169,093 | Edwards | Aug. 8, 1939 |
| 2,734,165 | Lufcy et al. | Feb. 7, 1956 |
| 2,754,474 | Barnhart | July 10, 1956 |